(12) United States Patent
Koyama

(10) Patent No.: US 6,310,987 B1
(45) Date of Patent: Oct. 30, 2001

(54) IMAGE PROCESSOR

(75) Inventor: Yoshinari Koyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/021,126

(22) Filed: Feb. 10, 1998

(30) Foreign Application Priority Data

Jun. 10, 1997 (JP) .................................................... 9-151813

(51) Int. Cl.[7] .................................................. G06K 9/54
(52) U.S. Cl. ........................................... 382/307; 382/324
(58) Field of Search ................................. 382/307, 312, 382/324, 277; 250/208.3, 206.1; 356/4, 215, 222

(56) References Cited

U.S. PATENT DOCUMENTS

| | | | |
|---|---|---|---|
| 4,792,982 | * 12/1988 | Devos et al. | 382/324 |
| 5,107,103 | * 4/1992 | Gruss et al. | 250/208.3 |
| 5,581,094 | 12/1996 | Hara et al. | 257/80 |
| 5,694,495 | * 12/1997 | Hara et al. | 382/324 |
| 5,815,608 | * 9/1998 | Lange et al. | 382/312 |
| 5,895,415 | * 4/1999 | Chow et al. | 607/54 |

FOREIGN PATENT DOCUMENTS 08292998   11/1996   (JP) .

* cited by examiner

*Primary Examiner*—Yon J. Couso
(74) *Attorney, Agent, or Firm*—Burns, Doane, Swecker & Mathis, LLP

(57) ABSTRACT

An artificial retina chip in a camera unit of an image processor according to the present invention converts an input image taken by the camera unit to analog signals, and outputs an image signal differential between each dot in a sensor-cell array in the artificial retina chip and a specific standard dot, as an analog signal. A signal converter converts the analog signal to binary digit, and stores the converted signals. When converted signals for one input image are stored, the signal converter outputs the converted signal to an identification unit as a digital signal. Namely, the data output from the camera unit is represented by the analog signal indicating the image signal differential between the dots, and the data output from the signal converter is represented by binary digit which is converted from the analog signal. Accordingly, the amount of the transmitted data is decreased.

12 Claims, 13 Drawing Sheets

a signal converter 2 converts the analog signals S1 into digital signals and stores the digital signals in an internal memory (not shown). Then, when digital signals corresponding to one input image 600 are stored, data of the digital signals is output to an image data processing unit 5 as digital signals S2 of non-processed-image.

IMAGE PROCESSOR

BACKGROUND OF THE INVENTION

1. Field of the Invention

This invention relates to an image processor which recognizes a shape of an identifying-object based on an input image, which is composed of an identifying-object image and a background image, and a comparison image.

2. Description of the Related Art

FIG. 13 shows a configuration of a conventional image processor. This conventional image processor performs image processing for recognizing a shape or a size of an identifying-object such as an industrial product or an agricultural product transmitted on a conveyor-belt. The operation of this conventional image processor will be briefly described below. A CCD (charge coupled device) 6 of a camera unit 1 inputs an input image 600 including an identifying-object image 610, converts data of the input image 600 into analog signals based on specific high resolution, and outputs the signals as analog signals S1. A signal converter 2 converts the analog signals S1 into digital signals and stores the digital signals in an internal memory (not shown). Then, when digital signals corresponding to one input image 600 are stored, data of the digital signals is output to an image data processing unit 5 as digital signals S2 of non-processed-image.

In the image data processing unit 5, the digital signals S2 of non-processed-image is processed to be divided into two gradations represented by binary data at each dot of the CCD 6. The image data processing unit 5 outputs the binary data and coordinate data for data indicating the identifying-object image 610 out of the binary data to an identification unit 3 as digital signals S3. The identification unit 3 recognizes the shape or the size of the identifying-object based on the digital signals S3, and obtains an identification result. The identification result is output to a control unit 4 as an identification result signal S4. The control unit 4 outputs control signals S5 to actuators such as a selecting device based on the identification result signal S4. Then, the identifying-object is selected based on the shape or the size of the identifying-object image 610.

As described above, because the input image 600 is converted into the analog signals S1 and the analog signals S1 are converted to digital signals S2, the image data processing unit 5 is provided for inputting the digital signals S2 and converting the digital signals S2 to binary data in the conventional image processor.

Namely, the amount of hardware and software of the conventional image processor is increased and it costs much because of the existence of the image data processing unit 5. In addition, as the amount of non-processed-image digital signal S2 of high resolution which is transmitted from the signal converter 2 to the image data processing unit 5 is very large, it takes much time to transmit the data. Since the process for recognizing the shape and others needs much time, it is difficult to constitute inexpensive circuits and to process the data at high speed.

SUMMARY AND OBJECTS OF THE INVENTION

An object of the present invention is to solve the above problems by providing an image processor in which circuits are constituted at low cost and processes for recognizing shapes and sizes of identifying-objects are performed at high speed.

According to one aspect of the image processor of the present invention, the image processor comprises:

(a) an image-signal-differential outputting unit which includes a group of receiving optics,
   for inputting an input image composed of an identifying-object image, which is made by taking an image of an identifying-object, and a background image, in which no identifying-object image is shown, by using the group of receiving optics, and
   for outputting an image-signal-differential between a standard receiving optic which is specifically defined and a receiving optic designated one after another in the group of receiving optics, with respect to each of the receiving optic designated one after another;

(b) a binary digit unit for inputting the image-signal-differential from the image-signal-differential outputting unit, converting the image-signal-differential to a value out of two values in binary digit indicating the identifying-object image and the background image, and outputting the value in the binary digit; and (c) an identification unit for recognizing the identifying-object taken as the identifying-object image in the input image, based on the value in the binary digit from the binary digit unit.

According to another aspect of the image processor of the present invention, the image processor comprises:

(a) an image-signal-differential outputting unit which includes a group of receiving optics,
   for inputting a comparison image composed of an identifying-object image, which is made by taking an image of an identifying-object, and a background image, in which no identifying-object image is shown, by using partial receiving optics out of the group of receiving optics,
   for inputting a master image composed of a standard identifying-object image, which is made by taking an image of a standard identifying-object, and a background image, in which no standard identifying-object image is shown, by using a rest of receiving optics, which have not been used for inputting the comparison image, out of the group of receiving optics,
   for designating a receiving optic one after another in the partial receiving optics used for inputting the comparison image, and a receiving optic, corresponding to the receiving optic used for the comparison image, in the rest of receiving optics used for inputting the master image, and
   for outputting an image-signal-differential between the receiving optic used for inputting the comparison image and the receiving optic, corresponding to the receiving optic used for the comparison image, used for inputting the master image;

(b) a ternary digit unit for inputting the image-signal-differential from the image-signal-differential outputting unit,
   for converting the image-signal-differential to a value out of three values in ternary digit indicating a case that the identifying-object image in the comparison image corresponds to the standard identifying-object image in the master image, a case that the master image has the standard identifying-object image and the comparison image has the background image, and a case that the master image has the background image and the comparison image has the identifying-object image, and for outputting the value in the ternary digit; and (c) an identification unit for calculating an area differential between the standard identifying-object image in the master image and the identifying-object image in the comparison image based on the value in the ternary digit output from the ternary digit unit, and recognizing the identifying-object taken as the identifying-object image in the comparison image, based on the area differential.

According to one aspect of the present invention, a method for image processing comprises steps of:

taking an input image composed of an identifying-object image, which is made by taking an image of an identifying-object, and a background image, in which no identifying-object image is shown, by using a group of receiving optics;

calculating an image-signal-differential between a standard receiving optic which is specifically defined and a receiving optic designated one after another in the group of receiving optics, with respect to each of the receiving optic designated one after another;

converting the image-signal-differential to a value out of two values in binary digit indicating the identifying-object image and the background image; and recognizing the identifying-object taken as the identifying-object image in the input image, based on the value in the binary digit.

According to another aspect of the present invention, a method for image processing comprises steps of:

taking a comparison image composed of an identifying-object image, which is made by taking an image of an identifying-object, and a background image, in which no identifying-object image is shown, by using partial receiving optics out of a group of receiving optics;

taking a master image composed of a standard identifying-object image, which is made by taking an image of a standard identifying-object, and a background image, in which no standard identifying-object image is shown, by using a rest of receiving optics, which have not been used for the comparison image, out of the group of receiving optics;

designating a receiving optic one after another in the partial receiving optics used for the comparison image, and a receiving optic, corresponding to the receiving optic used for the comparison image, in the rest of receiving optics used for the master image;

calculating an image-signal-differential between the receiving optic used for the comparison image and the receiving optic, corresponding to the receiving optic used for the comparison image, used for the master image;

converting the image-signal-differential to a value out of three values in ternary digit indicating a case that the identifying-object image in the comparison image corresponds to the standard identifying-object image in the master image, a case that the master image has the standard identifying-object image and the comparison image has the background image, and a case that the master image has the background image and the comparison image has the identifying-object image;

calculating an area differential between the standard identifying-object image in the master image and the identifying-object image in the comparison image based on the value in the ternary digit; and recognizing the identifying-object taken as the identifying-object image in the comparison image, based on the area differential.

According to one aspect of the present invention, an object-identifying apparatus comprises:

(a) a differential outputting unit for inputting input data composed of identifying-object data and other data, and outputting a differential between standard data specifically defined and each data in the input data, with respect to the each data;

(b) a distinguishing unit for inputting the differential with respect to the each data from the differential outputting unit, distinguishing the identifying-object data from the other data by converting the differential to be a value indicating the identifying-object data and a value indicating the other data, and outputting the value for the identifying-object data and the value for the other data; and (c) an identification unit for recognizing an identifying-object in the input data, based on the value for the identifying-object data and the value for the other data from the distinguishing unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF PREFERRED EMBODIMENTS

Embodiment 1.

Figure 1:
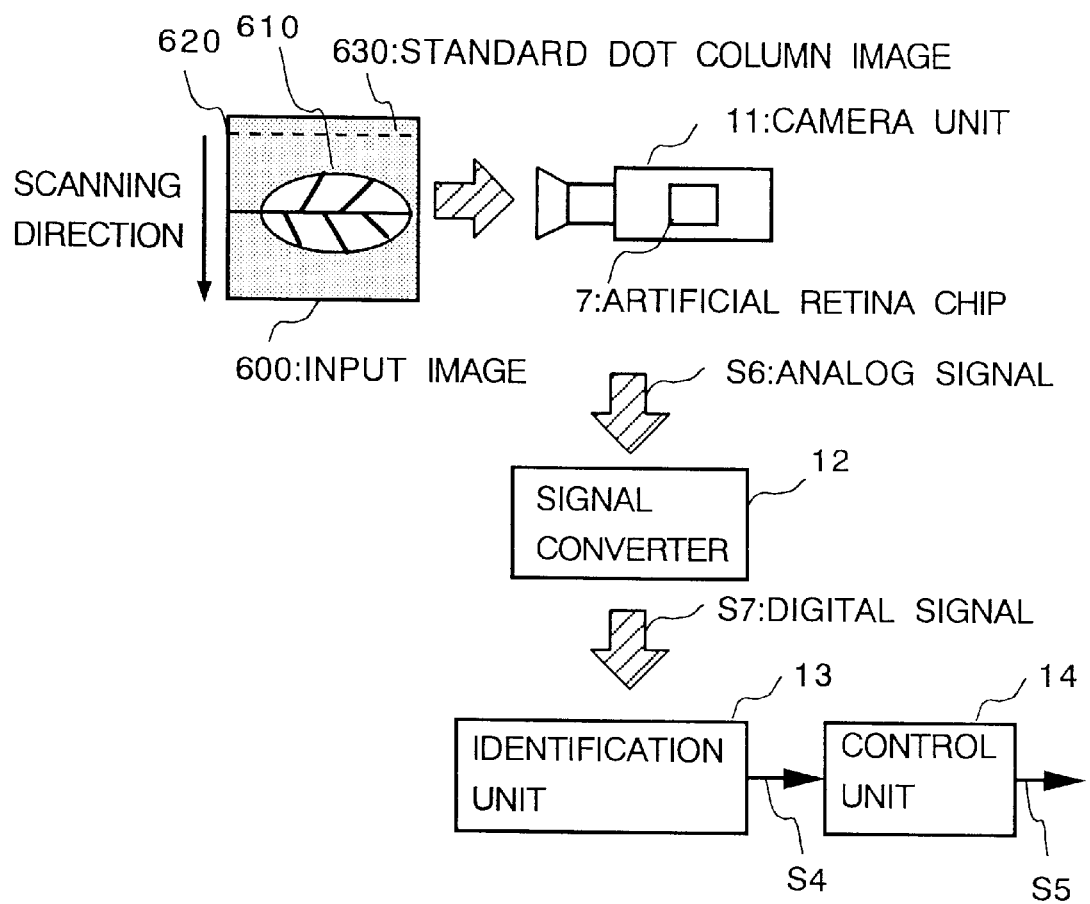
FIG. 1 shows a configuration of an image processor according to Embodiment 1 of the present invention.

An image processor according to the first embodiment of the present invention will now be described. FIG. 1 shows a configuration of the image processor, which is composed of a camera unit 11, a signal converter 12, an identification unit 13, and a control unit 14.

The camera unit 11 includes an artificial retina chip 7 which operates as an image-signal-differential outputting unit. The artificial retina chip 7 inputs an input image 600 and outputs a differential between image signals in specific dots, which are receiving optics used for inputting the input image 600, as an analog signal S6.

The signal converter 12 converts the analog signal S6 to a digital signal S7 and outputs the digital signal S7 to the identification unit 13.

The identification unit 13 inputs the digital signal S7, recognizes an identifying-object based on its shape, area and other features based on known techniques or arts, and outputs an identification result as an identification result signal S4. The control unit 14, similar to the conventional control unit 4, inputs the identification result signal S4 and transmits a control signal S5 to actuators based on the identification result signal S4.

When the artificial retina chip 7 takes an image of an identifying-object, an input image is input into the image processor. In FIG. 1, the input image is denoted by 600, the identifying-object image is denoted by 610, and a background image in which only background and no identifying-object image is shown is denoted by 620. A standard dot column image in the background image is denoted by 630.

Figure 2:
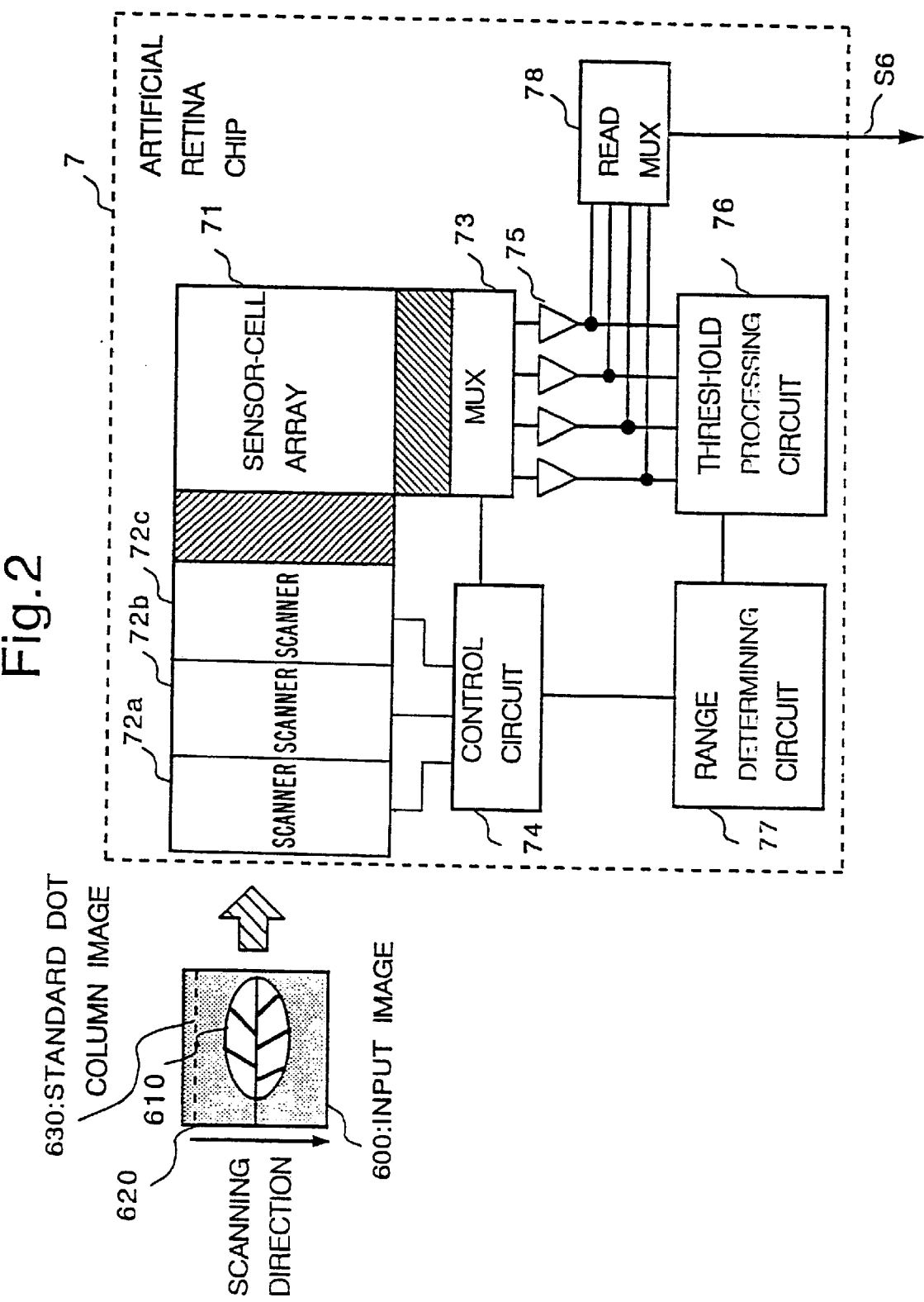
FIG. 2 shows a configuration of an artificial retina chip 7 of a camera unit 11 in the image processor according to Embodiment 1.

Referring to FIG. 2, the camera unit 11 will now be explained in detail. FIG. 2 shows the configuration of the artificial retina chip 7 of the camera unit 11 in the image processor according to Embodiment 1.

The artificial retina chip 7 operates as the image-signal-differential outputting unit of the present invention. The artificial retina chip 7 includes a sensor-cell array 71, in which sensor-cell arrays being receiving optics are two-dimensionally arrayed like a matrix. A sensor-cell optionally designated by an address is output as the analog signal S6 from the artificial retina chip 7. Assuming that a sensor-cell corresponds to each dot in the input image 600, a calculation result (an addition/subtraction result) between dots in the input image 600 is output as the analog signal S6 from the artificial retina chip 7. It is a feature of Embodiment 1 that an image signal differential, which is a subtraction result between dots, is output.

The artificial retina chip 7 is not explained in detail in this specification because it is not the object of the present invention to contrive the artificial retina chip itself. The image detector disclosed in the specification of Japanese Patent Application No. 7-95223 (Unexamined Japanese Patent Publication No. 8-292998) is utilized in the artificial retina chip of the present invention. The invention of Japanese Patent Application No. 7-95223 is entitled "Image detecting apparatus and Image detecting method" and filed by the same applicant as the present invention. The artificial retina chip 7 is composed of the sensor-cell array (receiving optics) 71, scanners 72a, 72b and 72c, a multiplexer(MUX) 73, a control circuit 74, an amplifier 75, a threshold processing circuit 76, a range determining circuit 77 and a read MUX 78. The artificial retina chip 7 of the present invention has the same configuration as the image detector shown in FIG. 1 of Japanese Patent Application No. 7-95223 except that the artificial retina chip 7 does not have the A/D converter provided in the image processor. When a read range in the sensor-cell array 71 is not limited, it is not necessary to provide the threshold processing circuit 76 and the range determining circuit 77. Therefore, it is acceptable either by not providing the circuits 76 and 77 or not actuating the circuits 76 and 77 in Embodiment 1.

The control circuit 74 designates a row address and a column address of a comparison dot (which is a sensor-cell for the input image 600) and a standard dot (which is used as a standard of comparison) in the sensor-cell array 71 one by one, in order to output an image signal differential between the comparison dot and the standard dot one by one. Then, the control circuit 74 transmits a read control signal of non-inverting output (+1) for the comparison dot and a read control signal of inverting output (−1) for the standard dot, to the scanners 72a, 72b and 72c and the multiplexer 73. Detailed configuration of the circuits of the devices 71 through 78 and detailed process of outputting the image signal differential between the comparison dot and the standard dot are described with reference to the image detector in the specification of Japanese Patent Application No. 7-95223 (Unexamined Japanese Patent Publication No. 8-292998).

The standard dot in this specification indicates a dot which is in the standard dot column image 630 in the input image 600 taken by the sensor-cell array 71 and has the same row address as the comparison dot whose image data has been already read. In this embodiment, the standard dot column image 630 is vertical with respect to the scanning direction so as to be discriminated from the identifying-object image 610 in the input image 600. In addition, the standard dot column image 630 indicates a scanning column image (for instance, the top column of the background image 620) in the background image 620 in which no identifying-object image 610 is shown. The column address of the standard dot column image 630 is always fixed by the control circuit 74.

Figure 3:
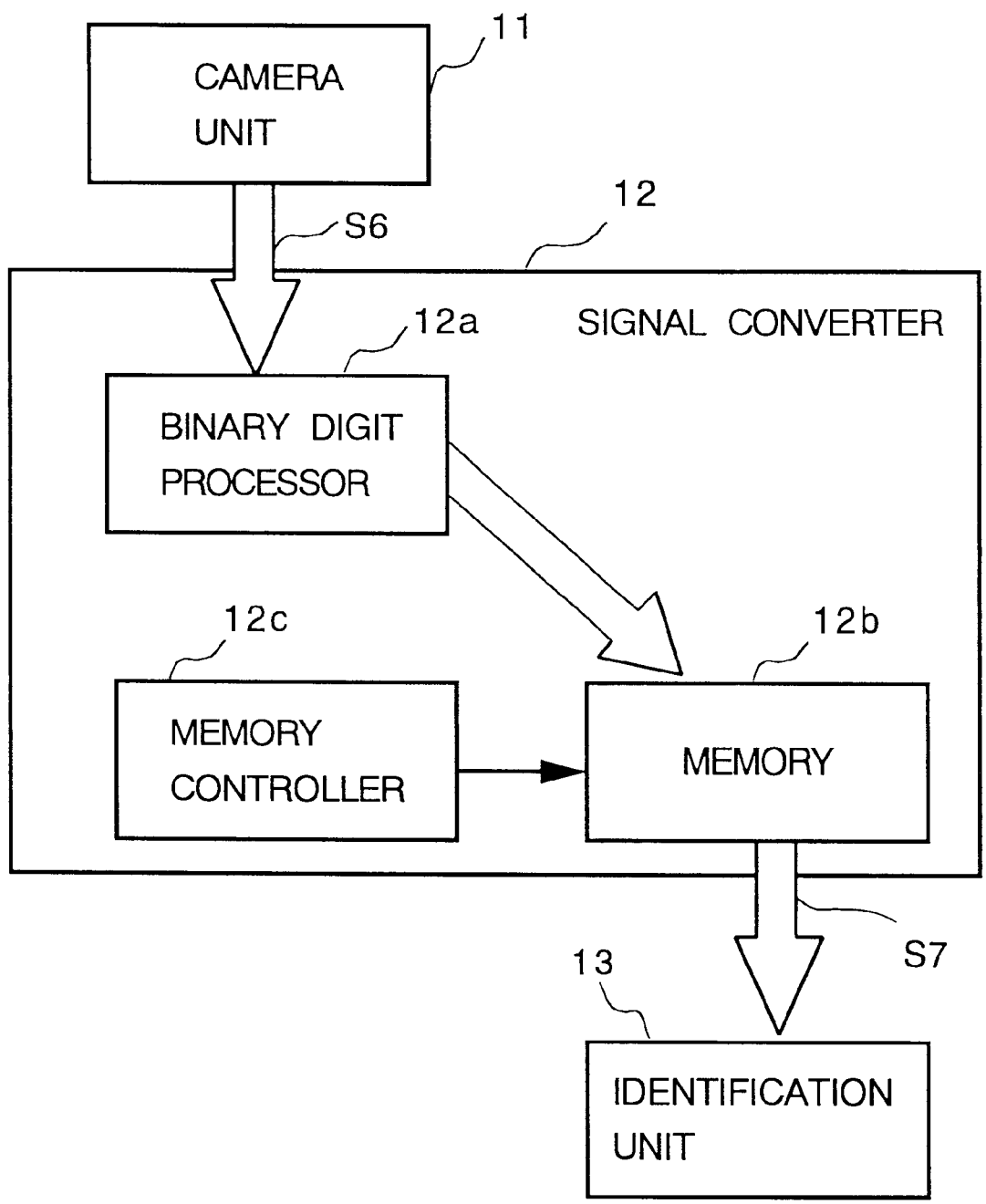
FIG. 3 shows a configuration of a signal converter 12 of the image processor according to Embodiment 1.

FIG. 3 shows the configuration of the signal converter 12 in the image processor according to Embodiment 1. The signal converter 12 is composed of a binary digit processor 12a, a memory 12b, and a memory controller 12c. The binary digit processor 12a converts the analog signal S6, which is output differential data between the comparison dot and the standard dot in the sensor-cell array 71 of the artificial retina chip 7 output from the camera unit 11, to digital signals represented by binary digit, and outputs the converted signals. For instance, the digital signals represented by binary digit are "1" for the identifying-object image 610 and "0" for the background image 620. The memory 12b stores the analog/digital(A/D) converted image data signals. The memory controller 12c controls the output of the memory 12b by using a memory control signal.

Figure 4:
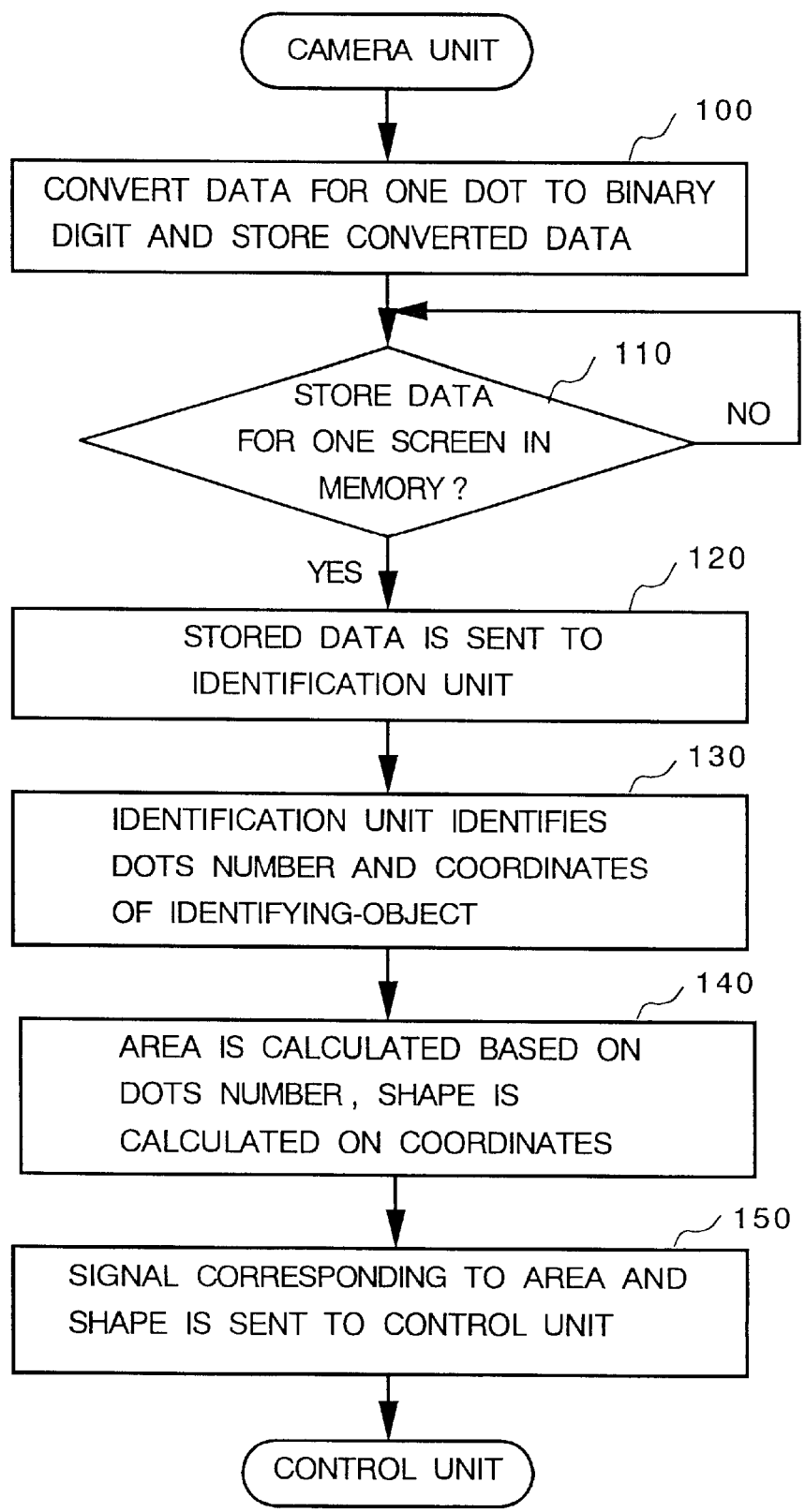
FIG. 4 is a flowchart showing the operation of the image processor according to Embodiment 1.

FIG. 4 shows the operation of the image processor according to Embodiment 1. First, the artificial retina chip 7 of the camera unit 11 takes an image of an identifying-object and inputs the image as the input image 600 including the identifying-object image 610. Then, the artificial retina chip 7 reads a sensor-cell (receiving optic) in the sensor-cell array 71 of the input image 600 as the analog signal S6 and transmits the analog signal S6 to the signal converter 12. In other words, the sensor-cell (receiving optic) is a differential between an output of the comparison dot, designated one by one by an address, in the input image 600 and an output of the standard dot, whose row address is the same as the comparison dot, in the standard dot column image 630.

In the signal converter 12, the binary digit processor 12a converts the analog signal S6, which is the output differential between the comparison dot and the standard dot from the artificial retina chip 7 in the camera unit 11, to digital signal represented by binary digit, such as "0" for the background image 620 and "1" for the identifying-object image 610. Then, the digital signal is stored in the memory 12b, which is for storing image data, per dot. (Step 100).

When data for one screen, that is for one input image 600, is stored in the memory 12b (Step 110 "YES"), the memory controller 12c sends a memory control signal to the memory 12b. Then, the data for one input image 600 is transmitted to the identification unit 13 as digital signals S7. (Step 120).

When the identification unit 13 receives the digital signals S7 for one input image 600 from the signal converter 12, the identification unit 13 recognizes the number of dots and coordinates of the identification-object image 610 based on the digital signals S7. (Step 130). The area of the identifying-object is calculated by using the number of dots and the shape of the identifying-object is calculated by using the coordinates. (Step 140). Based on the calculated area and shape of the identifying-object, one of identification results which have been previously stored in a table (not shown) to be corresponding to areas and shapes, is read and the identification result is transmitted to the control unit 14. (Step 150).

Similar to the conventional art, the control unit 14 transmits a control signal to actuators (not shown), such as a selecting device, based on the identification result from the identification unit 13 and actuates the actuators.

Figure 5:
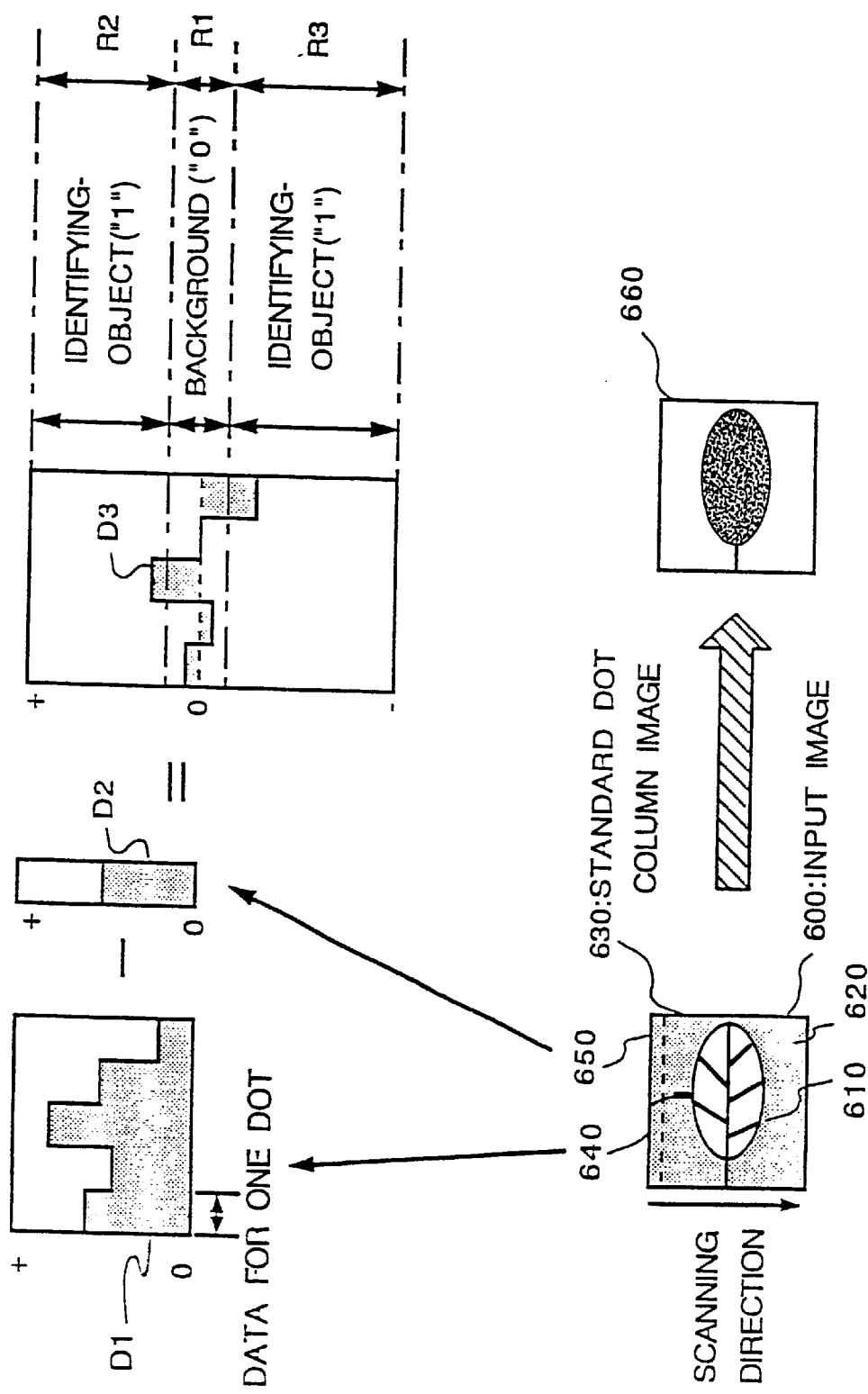
FIG. 5 shows processes performed in the artificial retina chip 7 and the signal converter 12.

FIG. 5 illustrates processes performed in the artificial retina chip 7 and the signal converter 12. In FIG. 5, D1 indicates comparison dot data of a dot group 640 in the input image 600 taken by the sensor-cell array 71 of the artificial retina chip 7. The dot group 640 is one dot wide with respect to the direction of columns and several dots long with respect to the direction of rows (scanning direction). D2 indicates standard dot data of a dot 650 in the standard dot column image 630 having the same row address as the dot group 640. D3 indicates output differential data of image signal between the comparison dot data D1 output as the analog signal S6 from the artificial retina chip 7, and the standard dot data D2. A dot image, represented in white and black indicating binary digit data of the input image 600 stored in the memory 12b, is denoted by 660.

Binary digit processing in the binary digit processor 12a of the signal converter 12 is explained with reference to the data D3. Data in a specific range in the vicinity of "0", that is the data of the background image 620 whose differential with respect to the data D2 of the standard dot column image 630 is within a specific range R1, has a similar value to the data D2 of the standard dot column image 630. Namely, the subtraction result of the data in the vicinity of "0" with respect to the data D2 is around the value in the vicinity of the gradation center. Therefore, after receiving the differential output data D3 from the artificial retina chip 7, the binary digit processor 12a converts the data D3 to "0" indicating the background image 620. Data in a range R2 or R3, that is out of the specific range, is converted to "1" indicating identifying-object image 610. The reason is that when a differential of the identifying-object with respect to the data D2 of the standard dot column image 630 is larger or smaller than a specific value, the shape or others of the identifying-object corresponds to a value apart from the center of the gradation showing darkness and lightness. The ranges R1 through R3 used for the binary digit processing in the binary digit processor 12a are adjustable and optionally defined based on the input image 600.

After the above processes have been performed for the whole input image 600, binary digit data such as the dot image 660, is stored in the memory 12b of the signal converter 12. In the dot image 660, the area designated by "1" indicating the identifying-object image 610 is shown in black and the area designated by "0" indicating the background image 620 is shown in white, for instance. Such binary data is output from the memory 12b and transmitted to the identification unit 13, by the control of the memory controller 12c.

Figure 13:
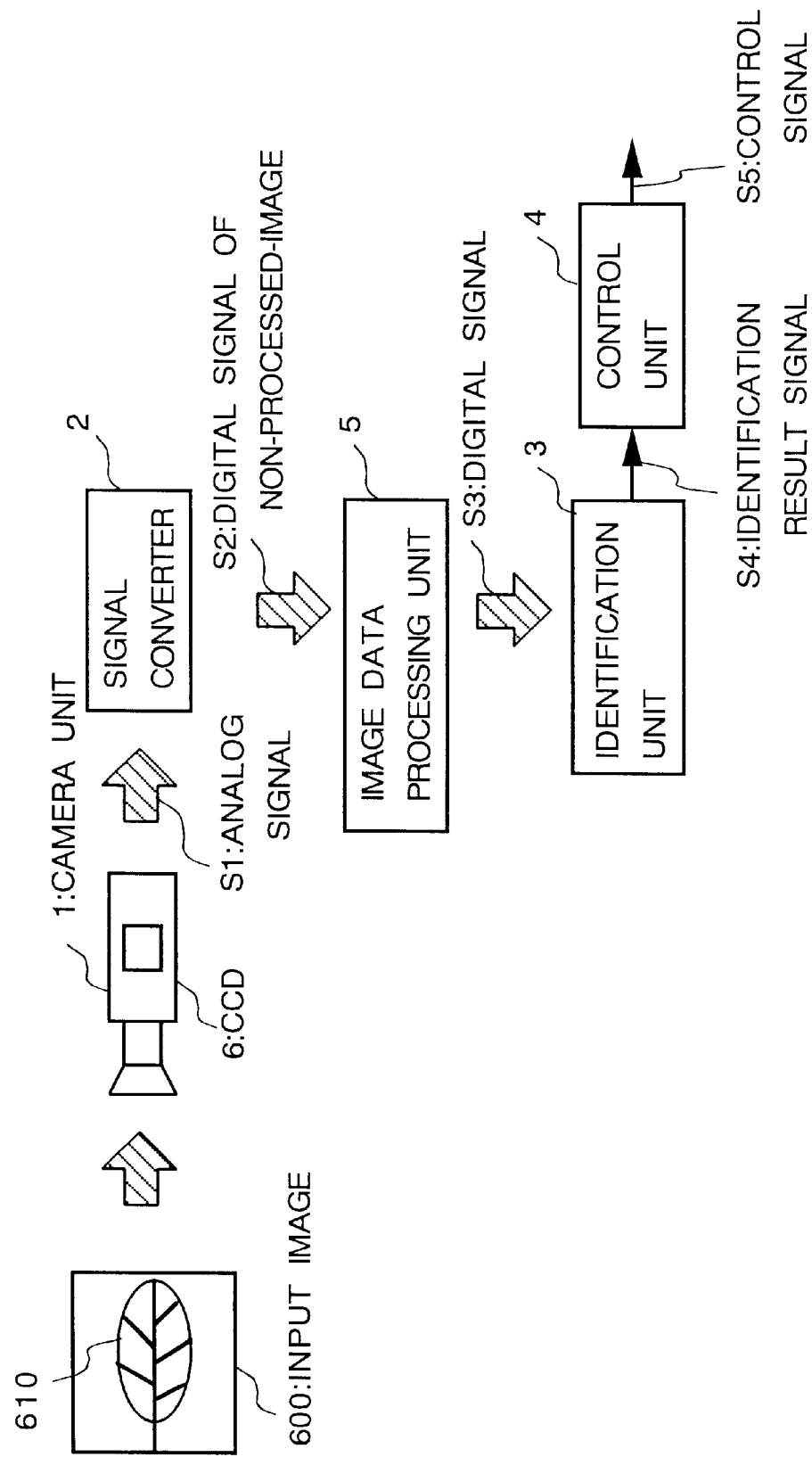
FIG. 13 shows a configuration of a conventional image processor.

As stated above, the artificial retina chip 7 according to the image processor of Embodiment 1 outputs a differential which is a subtraction result between an image signal of the standard dot column image 630 in the input image 600 and an image signal of each sensor-cell for the input image 600. In Embodiment 1, as it is not necessary to provide the image data processing unit 5 between the signal converter 2 and the identification unit 3 as shown in the conventional art of FIG. 13, it is possible to lessen the amount of hardware (H/W) and software (S/W). In addition, because there is no need to transmit a large amount of digital signals of non-processed-image from the signal converter to the image data processing unit, it is possible to perform the identification process for the identifying-object at high speed.

The decrease of transmitted data amount is explained with showing concrete values. For instance, supposing that the camera unit 11 has 640×480 dots resolution, there are 256 gradations (8 bits) per dot, and the memory 12b of the signal converter 12 has just the amount for storing image data of one input image 600, data of 256 gradations (8 bits) is transmitted to the image data processing unit 5 from the signal converter 2 in the conventional art. On the other hand in Embodiment 1, the amount of memory and transmitted data becomes one-eighth because differentials of analog signals output from the camera unit 11 are converted to two gradations (1 bit) by the binary digit processor 12a of the signal converter 12, and the converted data for the whole one input image 600 is stored in the memory 12b to be output. The amount of memory and the transmitted data for one input image 600 in the conventional art is around 2.45M bits (640×480×8 bits). Accordingly, the amount of memory and transmitted data in the present embodiment is largely lessened to be one-eighth of the above bits, that is around 307K bits.

Embodiment 2.

In Embodiment 2, the decrease of H/W and the increase of processing speed are realized by providing and using a counter instead of the memory 12b in the signal converter 12 of Embodiment 1. Therefore, only the configuration and the function of the signal converter and the identification unit in Embodiment 2 are different from those in Embodiment 1. Such different points will now be described.

Figure 6:
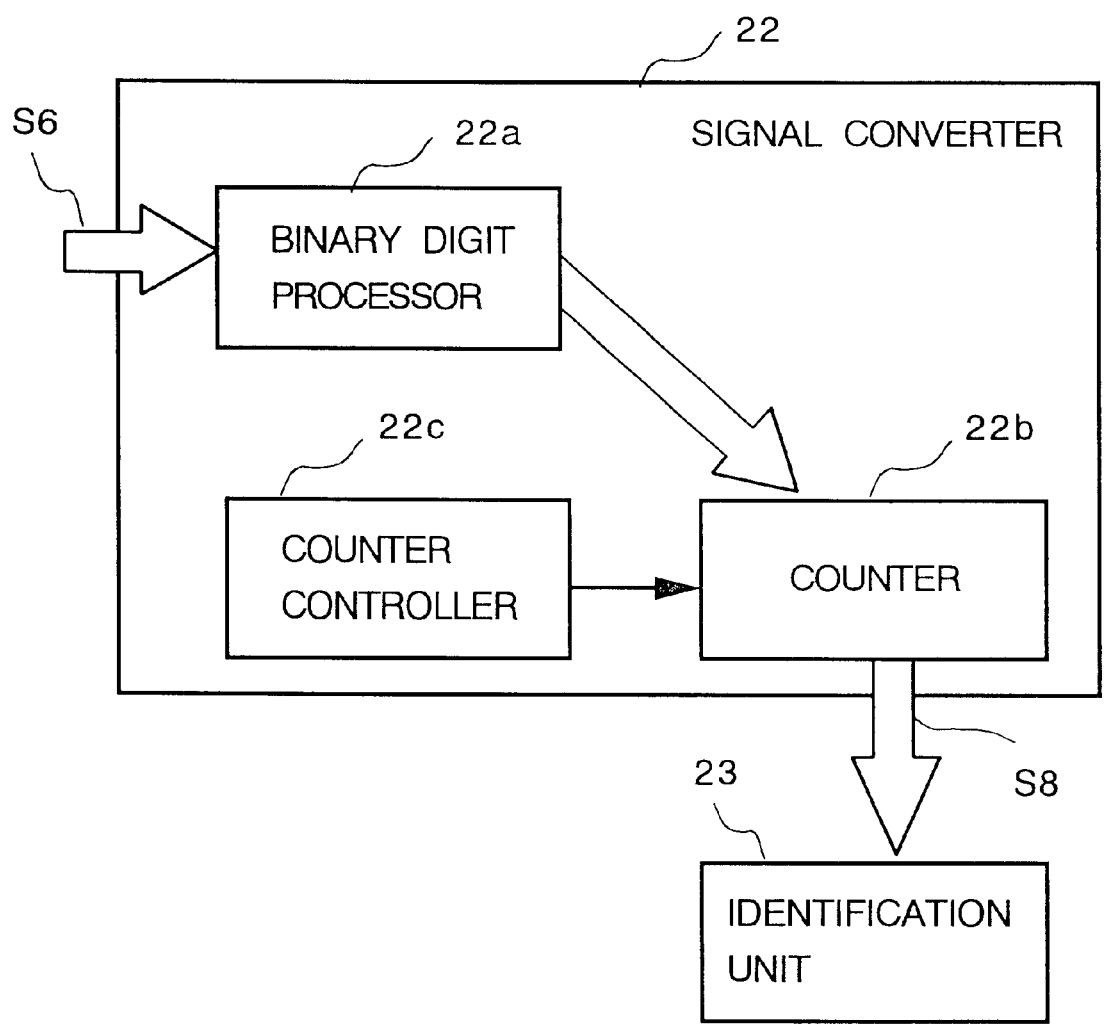
FIG. 6 shows a signal converter 22 and an identification unit 23 according to Embodiment 2 of the present invention.

FIG. 6 shows a signal converter 22 and an identification unit 23 according to Embodiment 2. The signal converter 22 is composed of a binary digit processor 22a, a counter 22b, and a counter controller 22c. Similar to Embodiment 1, the binary digit processor 22a receives the analog signal S6, which is output differential between the comparison dot and the standard dot of the artificial retina chip 7, output from the camera unit 11. Then, the binary digit processor 22a converts the analog signal S6 to a digital image data signal represented by binary digit. One of the binary digit is "1" indicating the identifying-object image 610 and the other is "0" for the background image 620. Based on a counter control signal from the counter controller 22c, the counter 22b counts "1" indicating the identifying-object image 610 out of the A/D converted image data signals from the binary digit processor 22a. The counter 22b counts the number of sensor-cells (receiving optics), that is, the number of dots for the identifying-object image 610 and outputs the counted number after counting the dot number for one input image 600.

The identification unit 23 in Embodiment 2 has previously stored identification results corresponding to areas of the identifying-object image 610 in a table (not shown), and outputs an identification result corresponding to an area of the identifying-object image 610. Other configurations except the signal converter 22 and the identification unit 23 in Embodiment 2 are the same as those shown in FIG. 1 of Embodiment 1.

Figure 7:
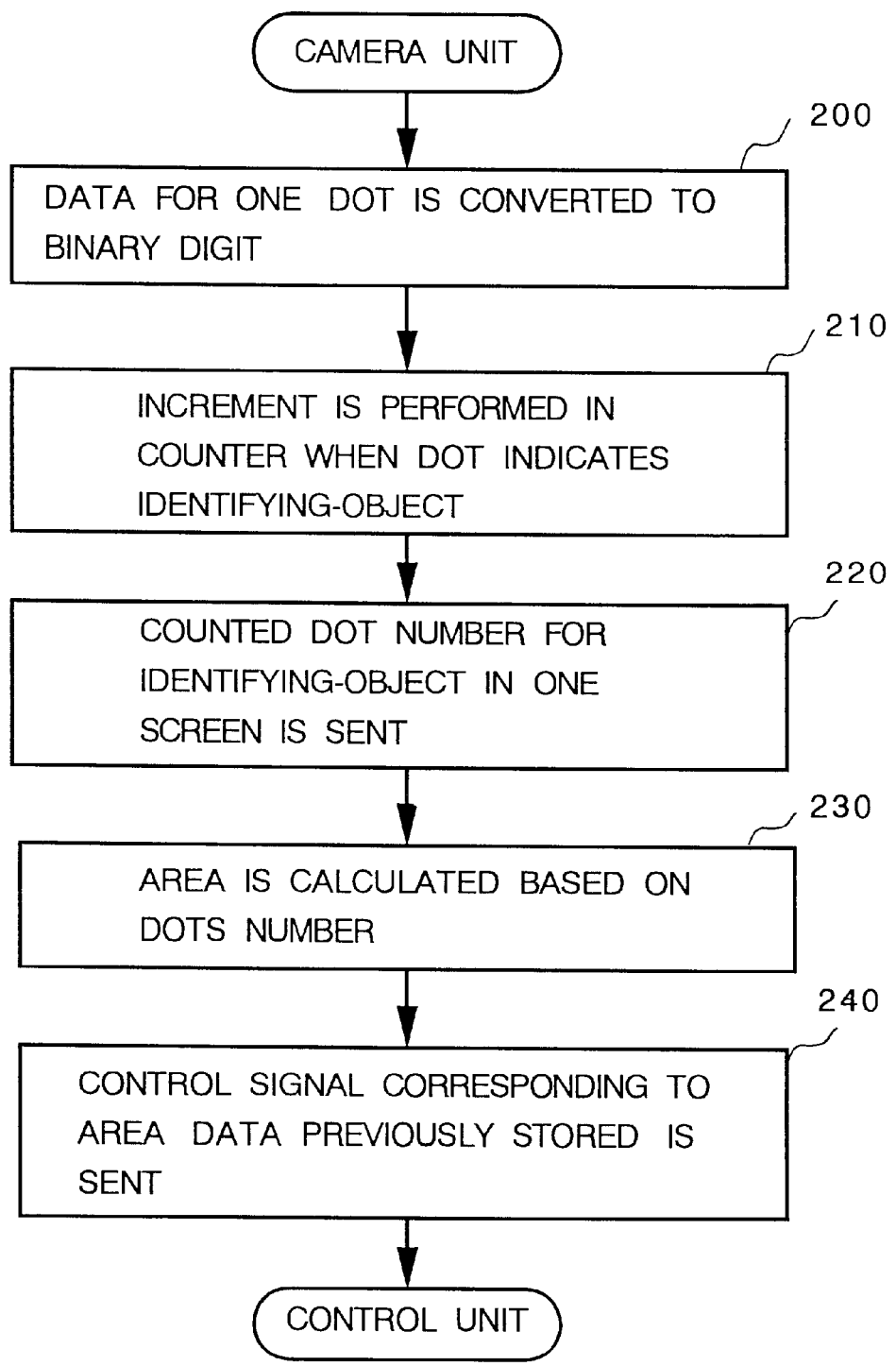
FIG. 7 is a flowchart showing the operation of the image processor according to Embodiment 2.

Referring to FIG. 7, the operation of the image processor according to Embodiment 2 will now be described with respect to the signal converter 22 and the identification unit 23.

The artificial retina chip 7 of the camera unit 11 inputs the input image 600 including the identifying-object image 610, reads a differential between image signals of a comparison dot which is a sensor-cell for the input image 600 and a standard dot for the standard dot column image 630 in the input image 600, and outputs the differential to the signal converter 22 as the analog signal S6.

In the signal converter 22, the binary digit processor 22*a* converts the analog signal S6 which is the output differential of the image signals between the comparison dot and the standard dot from the artificial retina chip 7, to a digital signal represented by binary digit, such as "0" for the background image and "1" for the identifying-object image. Then, the digital signal is output to the counter 22*b*. (Step 200). The operations up to this process in Embodiment 2 are the same as Embodiment 1.

Based on a counter control signal from the counter controller 22*c*, the counter 22*b* inputs the digital signal from the binary digit processor 22*a*, and counts the number of dots, being the number of sensor-cells for the identifying-object image 610, by performing increment when the digital signal "1" indicating an identifying-object image 610 is input. (Step 210). After counting the number of dots for the whole one input image 600, the counted number is transmitted to the identification unit 23 as a digital signal S8. (Step 220)

When the identification unit 23 receives the digital signal S8 indicating the number of counts from the signal converter 22, the identification unit 23 detects the number of counts, that is the number of dots of the sensor-cells for the identifying-object image 610, based on the digital signal S8. Then, the identification unit 23 calculates the area of the identifying-object image 610 depending upon the number of counts (Step 230). The identification unit 23 reads an identification result based on identification results previously stored in a table (not shown) to be corresponding to the areas, and outputs the identification result to the control unit 14. (Step 240) The control unit 14 transmits a control signal for operation to actuators (not shown), such as a selecting device, based on the identification result from the identification unit 23.

In Embodiment 2, similar to Embodiment 1, since the artificial retina chip 7 outputs a differential, being a subtraction result between an image signal of the standard dot column image 630 in the input image 600 and an image signal of each sensor-cell for the input image 600, it is not necessary to provide the image data processing unit between the signal converter 22 and the identification unit 23. Therefore, the amount of hardware (H/W) and software (S/W) is lessened. In addition, since it is not necessary to transmit a large amount of digital signals of non-processed-image from the signal converter to the image data processing unit, amount of transmitted data is decreased. Namely, the identification process for the identifying-object is performed at high speed.

Particularly in Embodiment 2, the counter 22*b* for counting the number of dots in the image data, that is the number of sensor-cells (receiving optics) for the identifying-object image 610, is provided in the signal converter 22 instead of the memory 12*b* for storing image data. The identification unit 23 recognizes the area of the identifying-object based on the number of the counting. Comparing with Embodiment 1, the amount of transmitted data from the signal converter 22 to the identification unit 23 is further decreased. Consequently, the process in the identification unit 23 is performed at high speed.

The decrease of transmitted data amount will now be explained with showing concrete values. In the conventional art, supposing that the camera unit 11 has 640×480 dots resolution, there are 256 gradations (8 bits) per dot, and the memory in the signal converter 2 has just the amount for storing data of one input image 600, data of 256 gradations (8 bits) is transmitted to the image data processing unit 5 from the signal converter 2. On the other hand in Embodiment 2, after the binary digit processor 22*a* in the signal converter 22 converts a differential of the analog signal from the camera unit 11 to two gradations (1 bit), the counter 22*b* counts the number of dots of the significant value in the two gradations data. In this case, the largest number of the dots is 640×480=307K dots, which can be counted by a 19 bit counter. Therefore, the amount of transmitted data becomes around 1/130000 (19/(640×480×8)) times as much as the transmitted data amount of 19 bits of the conventional art. Namely, the transmitted data amount is largely lessened.

Embodiment 3.

The feature of Embodiment 3 is two camera units 11 and two signal converters 12 of Embodiment 1 are provided in order to recognize a volume of a cubic identifying-object, such as a box. Each of the two camera units and each of the two signal converters are similar to those of Embodiment 1.

Figure 8:
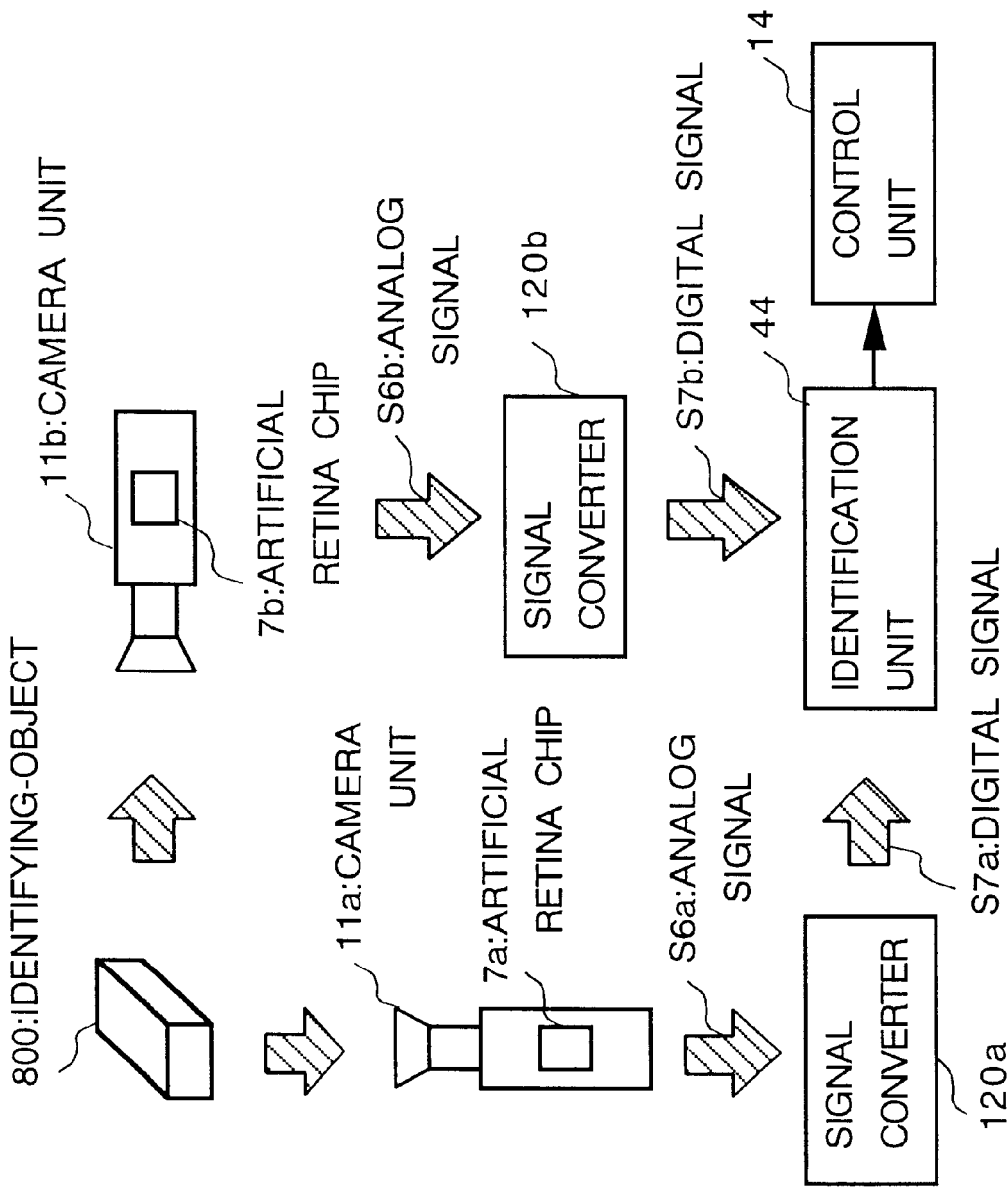
FIG. 8 shows a whole configuration of an image processor according to Embodiment 3.

FIG. 8 shows the configuration of the image processor according to Embodiment 3. In FIG. 8, camera units 11*a* and 11*b* include artificial retina chips 7*a* and 7*b* each of which is similar to that of Embodiment 1. The camera units 11*a* and 11*b* take images of an identifying-object 800 with respect to two orthogonal directions. Namely, one of the two camera units 11*a* and 11*b* takes the image with respect to the vertical direction (from the bottom) and the other does with respect to the horizontal direction (from the side). Signal converters 120*a* and 120*b* respectively convert analog signals S6*a* and S6*b*, being output differentials from the camera units 11*a* and to digital signals S7*a* and S7*b*, and output the signals S7*a* and S7*b* to an identification unit 44. Each of the signal converters 120*a* and 120*b* is similar to that of Embodiment 1. The identification unit 44 calculates the volume of the identifying-object 800 based on the digital signals S7*a* and S7*b*, and transmits an identification result, corresponding to the volume, to the control unit 14. It will be described later how to calculate the volume of the identifying-object 800.

Figure 9:
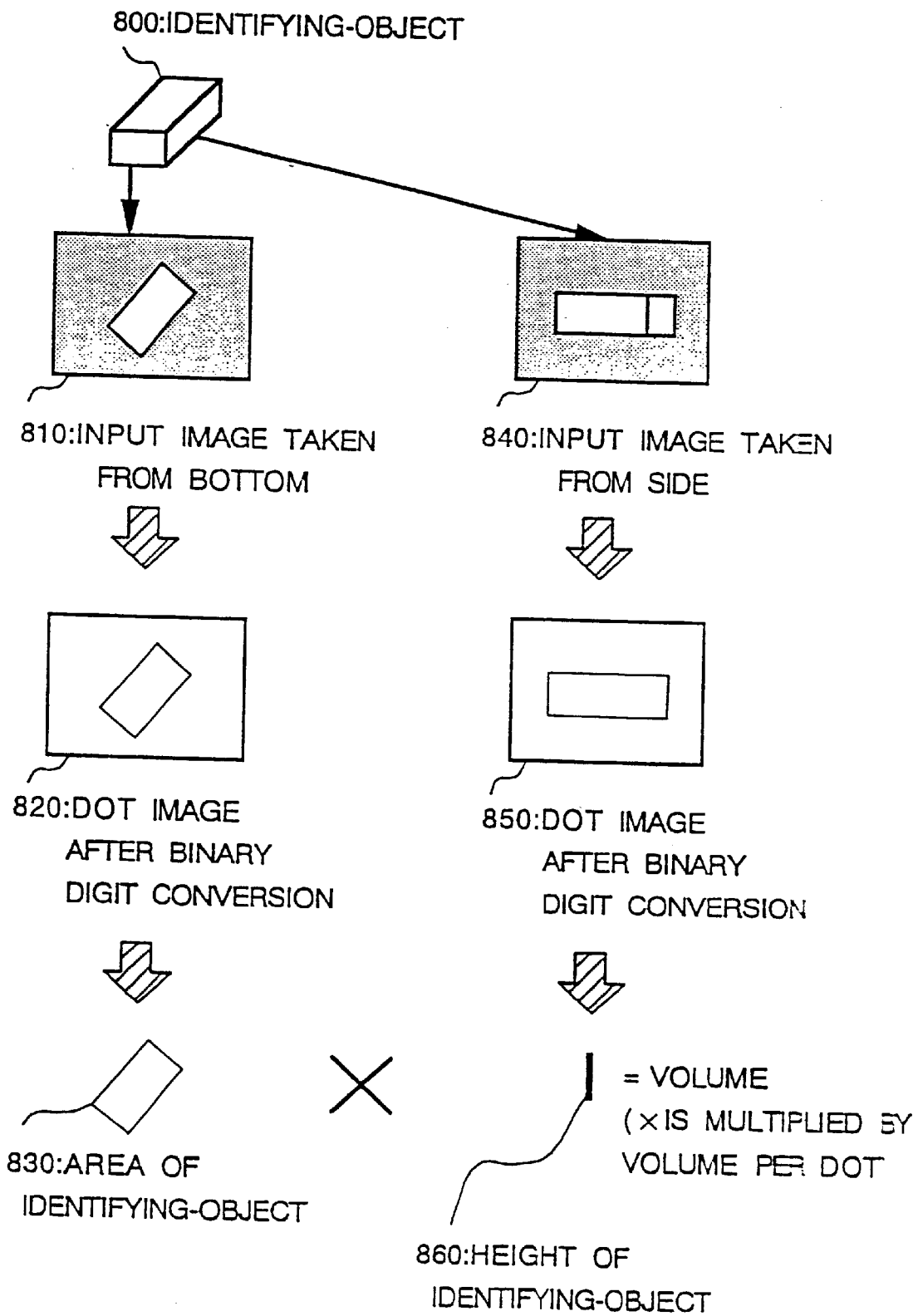
FIG. 9 shows processes performed in the image processor according to Embodiment 3.

The operation of the image processor according to Embodiment 3 is now described. FIG. 9 illustrates processes performed in the image processor of Embodiment 3. In FIG. 9, the identifying-object 800 and an input image 810 of the identifying-object 800 taken from the bottom (with respect to the vertical direction) by the camera unit 11*a* are shown. The signal converter 120*a* converts output data of the input image 810 from the artificial retina chip 7*a* to binary digit. The binary digit is represented in black and white as a dot image 820 in FIG. 9. The area with respect to the bottom of the identifying-object 800 calculated in the identification unit 44 based on the dot image 820 is shown as an area image 830.

An input image of the identifying-object 800 taken from the side (with respect to the horizontal direction) by the camera unit 11b is denoted by 840. The signal converter 120b converts output data of the input image 840 from the artificial retina chip 7b to binary digit. The binary digit is represented in black and white as a dot image 850 in FIG. 9. The height of the identifying-object 800 calculated in the identification unit 44 based on the dot image 850 is also shown as a height image 860.

The following calculations are performed in the identification unit 44 in order to obtain the volume of the identifying-object 800. Data on the area with respect to the bottom of the identifying-object 800 is the output data (the number of dots) of the signal converter 120a. Data on the height with respect to the side of the identifying-object 800 is the output data (the number of dots) of the signal converter 120b. The area data is multiplied by the height data. Further, the multiplied value is multiplied by a real-image volume per dot so as to obtain the real volume of the identification object 800. One dot is a sensor-cell of the sensor-cell array 71 in the artificial retina chip 7a or 7b. The real-image volume per dot is calculated by multiplying a real-image area for one dot of the artificial retina chip 7a by a real-image length (height) for one dot of the artificial retina chip 7b.

After the volume of the identifying-object 800 is calculated in the identification unit 44, one of identification results which have been previously stored in a table (not shown) to be corresponding to volumes of the identifying-object 800 is read and transmitted to the control unit 14. Similar to the Embodiments 1 and 2, the control unit 14 transmits a control signal to actuators (not shown), such as a selecting device, based on the identification result from the identification unit 44.

As described above, the two camera units 11a and 11b, each of which is similar to that of Embodiment 1, and the two signal converters 120a and 120b, each of which is similar to that of Embodiment 1, are provided in the image processor of Embodiment 3. The identification unit 44 calculates the volume of the identifying-object 800 by using the area and the height of identifying-object 800, which are obtained by taking images of the identifying-object 800 through the two camera units 11a and 11b with respect to the two different directions. Similar to Embodiments 1 and 2, as it is not necessary to provide the image data processing unit, the amount of hardware (H/W) and software (S/W) is lessened. In addition, since there is no need to transmit a large amount of digital signals of non-processed-image from the signal converter to the image data processing unit, the amount of transmitted data is decreased and the identification process for the identifying-object is performed at high speed. Especially in Embodiment 3, it is possible to identify the identifying-object 800 more accurately than in Embodiments 1 and 2, because only projected area of the identifying-object 800 is used for the identification process in Embodiments 1 and 2.

Embodiment 4.

In Embodiments 1 through 3, it is possible to recognize the shape or others of the identifying-object even when each input image 600 has different brightness, because the standard dot column image 630 which is not included in the identifying-object image 610 in the input image 600 is used as a standard dot image for every input image 600.

On the other hand, Embodiment 4 is contrived by changing some points of Embodiment 2 on the supposition that each identifying-object image in each input image has around the same brightness. As described in Embodiments 1 through 3, an output differential between an image signal of the standard dot column image 630 which is the background image in the input image 600 taken by the camera unit 11, and an image signal of each dot which is each sensor-cell is used for recognizing the identifying-object. In Embodiment 4, an image of a standard identifying-object is always taken to be input in the half of the sensor-cell array 71 of the artificial retina chip 7, or a master image made by taking an image of the standard identifying-object has been previously input in the half of the sensor-cell array 71 of the artificial retina chip 7. Then, an area differential between the master image and a comparison image made by taking an image of the identifying-object one after another into the rest half of the cells in the sensor-cell array 71 is calculated. The shape or others of the identifying-object is recognized based on the area differential. Therefore, only the configuration and the function of the signal converter and the identification unit in Embodiment 4 are different from those in Embodiment 1. Embodiment 4 is now described with reference to the different respects.

Figure 10:
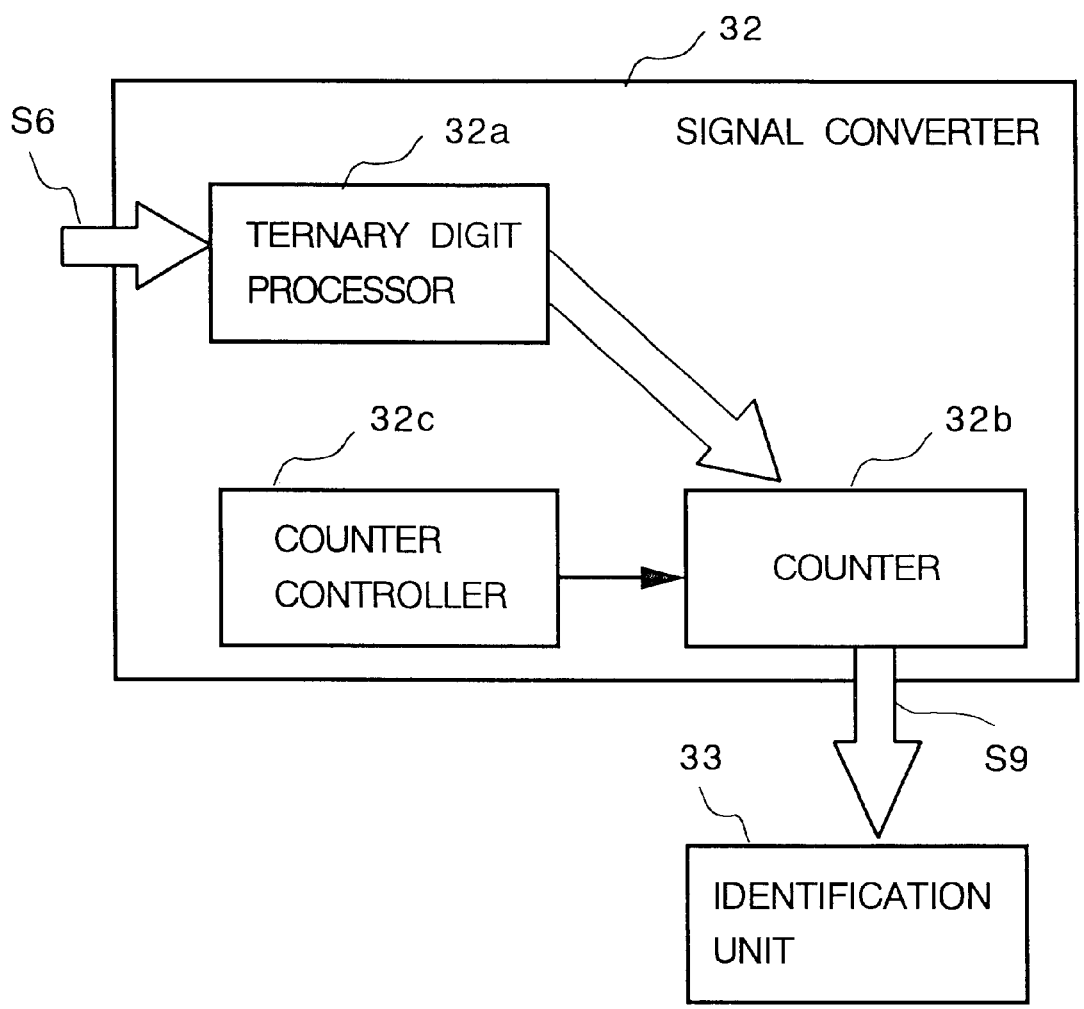
FIG. 10 shows the configuration of a signal converter 32 and an identification unit 33 according to Embodiment 4 of the present invention.

FIG. 10 shows a signal converter 32 and an identification unit 33 according to Embodiment 4. The signal converter 32 is composed of a ternary digit processor 32a, a counter 32b, and a counter controller 32c. The ternary digit processor 32a converts an output differential between dots from the artificial retina chip 7 of the camera 11 to ternary digital signals such as 1, 0, −1. The operation about this procedure will be described later. The counter 32b counts the number of dots to detect an area differential between the comparison image and the master image by performing increment or decrement based on the digital signals represented by ternary digit such as 1, 0, or −1. Then, the counted dot number is output from the counter 32b as a signal S9, based on a control signal from the counter controller 32c.

The identification unit 33 has previously stored identification results of the identification object 610, which are corresponding to the area differentials with respect to the standard identifying-object image in the master image. The identification unit 33 transmits an identification result, corresponding to the number of counts of counter 32b, of the identifying-object image 610 to the control unit 14.

The operation of the Image processor according to Embodiment 4 will now be described with reference to FIG. 11. A group of sensor-cells composing the sensor-cell array 71 of the artificial retina chip 7 is divided into two, upper half and lower half, based on a control from the control circuit 74. A master image made by taking an image of standard identifying-object is always taken to be input in the lower sensor-cells, for instance. A comparison image including an identifying-object is taken to be input in the upper sensor-cells. Then, an output differential between an image signal of comparison dot which is the sensor-cells for the comparison image, and an image signal of the standard dot which is the sensor-cells for the master image, is transmitted to the signal converter 32 as an analog signal S6.

In the signal converter 32 according to Embodiment 4, the ternary digit processor 32a converts the analog signals S6 to ternary digital signals for such as "1", "0", or "−1". (Step 300)

Figure 12:
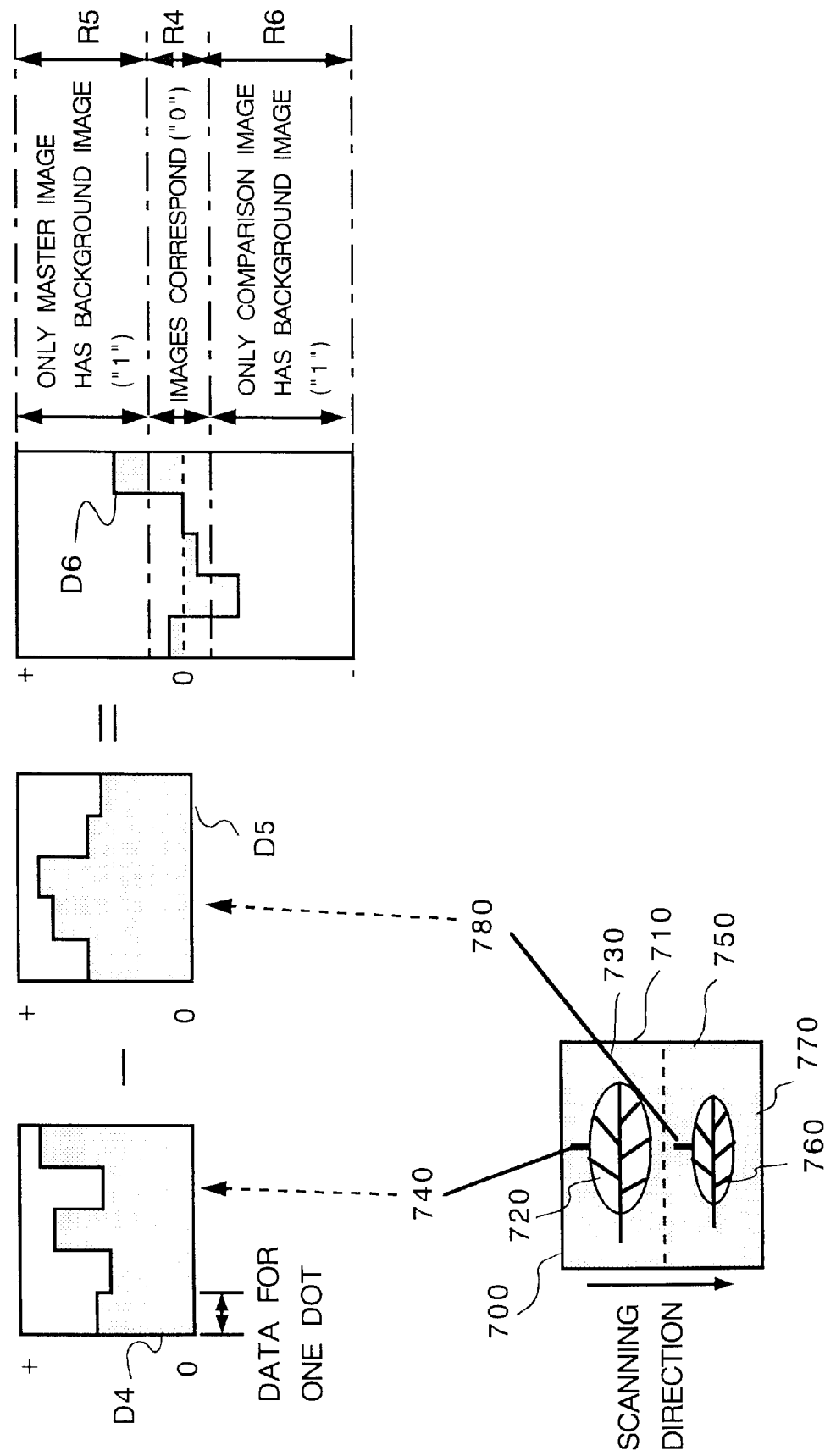
FIG. 12 shows processes performed in the artificial retina chip 7 and the signal converter 32 according to Embodiment 4.

FIG. 12 illustrates processes performed in the artificial retina chip 7 and the signal converter 32 according to Embodiment 4. In FIG. 12, an input image 700 is input into the artificial retina chip 7. In the input image 700, a comparison image 710 is input every time when an image of the identifying-object is taken, and a master image 750, being a specific image, is always input to be compared with the comparison image 710. Each of the comparison image 710 and the master image 750 is taken by using the half of the sensor-cells, such as the upper half or the lower half. An identifying-object image in the comparison image 710 is denoted by 720, and a background image in the comparison image 710 is denoted by 730. A standard identifying-object image in the master image 750 is denoted by 760, and a background image in the master image 750 is denoted by 770.

In FIG. 12, D4 indicates image signal data of the sensor-cells of a dot group 740, being one dot wide with respect to the column direction and several dots long with respect to the row direction, in the comparison image 710 input by the upper sensor-cells in the artificial retina chip 7. D5 indicates image signal data of the sensor-cells of a dot group 780 corresponding to the dot group 740, in the master image 750 input by the lower sensor-cells in the artificial retina chip 7. D6 indicates an output differential of image signal calculated by subtracting the data D5 from the data D4 output from the artificial retina chip 7.

Now, the operation of the ternary digit processor 32a will be explained. The ternary digit processor 32a inputs the output differential data D6 from the artificial retina chip 7, and converts the output differential data D6 to ternary digit such as "1", "0", and "−1" based on ranges R4 through R6 which are specified by specific thresholds.

In the output differential data D6, data in the range R4, which is in the vicinity of 0 indicating that an image signal of the comparison image 710 and an image signal of the master image 750 are around the same, is converted to "0", for instance. In the case that the master image 750 has the background image 770 and the comparison image 710 has the identifying-object image 720, the value of the output differential data D6 is in the range R5. The range R5 is larger than the range R4 with respect to the direction of "+" from the center of the gradation showing darkness and lightness. Therefore, the value of the output differential data D6 is converted to "1", for instance. In the case that the master image 750 has the standard identifying-object image 760 and the comparison image 710 has the background image 730, the value of the output differential data D6 is in the range R6. The range R6 is smaller than the range R4 with respect to the direction of "−" from the center of the gradation showing darkness and lightness. Therefore, the value of the output differential data D6 is converted to "−1". Accordingly, the output differential data D6 is converted to ternary digit. It is possible to optionally define the width of the ranges R4 through R6 depending upon the output differential data D6 in the ternary digit processor 32a similar to the binary digit processor 22a of Embodiment 2.

As stated above, the ternary digit processor 32a in the signal converter 32 can divide the output differential data from the artificial retina chip 7 in the camera 11 into ternary digit, "0", "1" and "−1". "0" indicates that the identifying-object image 720 in the comparison image 710 corresponds to the standard identifying-object image 760 in the master image 750. "1" indicates that the comparison image 710 has the identifying-object image 720 and the master image 750 has the background image 770. "−1" indicates that the comparison image 710 has the background image 730 and the master image 750 has the standard identifying-object image 760.

Figure 11:
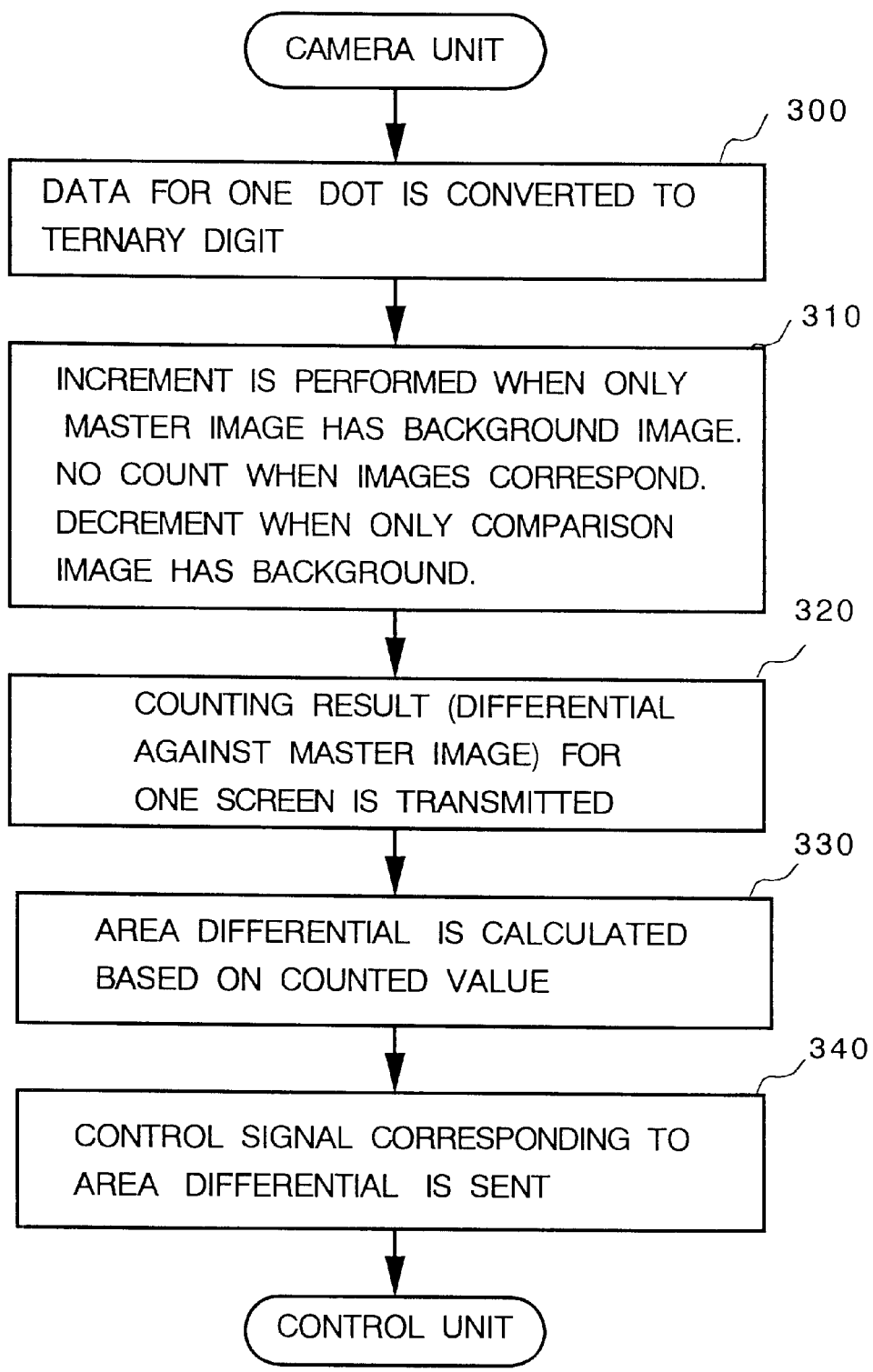
FIG. 11 is a flowchart showing an operation of the image processor according to Embodiment 4.

Now, the explanation for operation in Embodiment 4 is continued with reference to FIG. 11. When the counter 32b receives a digital signal of "1" indicating that the master image 750 has the background image 770 and the comparison image 710 has the identifying-object image 720 from the ternary digit processor 32a, the counter 32b performs increment of "1". On receiving a digital signal of "0" which indicates that the standard identifying-object image 760 in the master image 750 corresponds to the identifying-object image 720 in the comparison image 710, the counter 32b does not count at all. Then the counter 32b receives a digital signal of "−1" indicating that the master image 750 has the standard identifying-object image 760 and the comparison image 710 has the background image 730, the counter 32b performs decrement of "1". (Step 310)

After having counted the whole one comparison image 710, the counter 32b transmits the counted value indicating an area differential represented by dots between one comparison image 710 and one master image 750, to the identification unit 33 based on the control of the counter controller 32c. (Step 320)

The case of the counted value by the counter 32b being positive indicates that the identifying-object image 720 in the comparison image 710 is larger than the standard identifying-object image 760 in the master image 750 by the number of dots of the counted value. The case of the counted value by the counter 32b being negative indicates that the standard identifying-object image 760 in the master image 750 is larger than the identifying-object image 720 in the comparison image 710 by the number of dots of the counted value.

When the identification unit 33 receives the counted value from the signal converter 32, the identification unit 33 calculates an area differential between the identifying-objects in the comparison image 710 and the master image 750 based on the counted value. (Step 330) Then, the identification unit 33 reads an identification result from the table (not shown) in which identification results corresponding to area differentials have been previously stored. The identification unit 33 transmits the identification result to the control unit 14. (Step 340) Similar to Embodiment 2, the control unit 14 transmits a signal for operation to actuators, such as a selecting device, based on the identification result from the identification unit 33.

Accordingly in Embodiment 4, similar to Embodiments 1 through 3, since the output differential from the artificial retina chip 7 is utilized, it is not necessary to provide the image data processing unit between the signal converter 32 and the identification unit 33. Therefore, the amount of hardware (H/W) and software (S/W) is lessened. In addition, since it is not necessary to transmit a large amount of digital signals of non-processed-image from the signal converter to the image data processing unit, the amount of transmitted data is decreased. Namely, the identification process for the identifying-object is performed at high speed.

Comparing with Embodiment 2, it is possible to further lessen the amount of data transmitted to the identification unit 33 from the signal converter 32 and to perform processes in the identification unit 33 at higher speed in Embodiment 4. The reason is that, in Embodiment 4, the master image 750 is always input in the lower sensor-cells in the sensor-cell array 71 of the artificial retina chip 7 and the comparison image 710 is taken to be input in the upper sensor-cells. The master image 750 and the comparison image 710 is taken at the same time. A differential of image signal between corresponding sensor-cells in the master image 750 and the comparison image 710 is output per sensor-cell. Then, the output differential is converted to ternary digit in order that an area differential between the identifying-object image 720 in the comparison image 710 and the standard identifying-object image 760 in the master image 750 can be calculated by using the counter 32b. The identification unit 33 recognizes the area of the identifying-object image 720 based on the counted number indicating the area differential. Accordingly, identification processes performed in the identification unit 33 is further lessened.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. An image processor comprising:
   (a) an image-signal-differential outputting unit which includes a group of receiving optics,
      for inputting an input image composed of an identifying-object image, which is made by taking an image of an identifying-object, and a background image, in which no identifying-object image is shown, by using the group of receiving optics, and
      for outputting an image-signal-differential between a standard receiving optic which is specifically defined and a receiving optic designated one after another in the group of receiving optics, with respect to each of the receiving optic designated one after another;
   (b) a binary digit unit for inputting the image-signal-differential from the image-signal-differential outputting unit, converting the image-signal-differential to a value out of two values in binary digit indicating the identifying-object image and the background image, and outputting the value in the binary digit; and
   (c) an identification unit for recognizing the identifying-object taken as the identifying-object image in the input image, based on the value in the binary digit from the binary digit unit.

2. The image processor of claim 1, further comprising a counter for inputting the value from the binary digit unit, counting the value indicating the identifying-object image in the binary digit, and outputting a number of counts for the value indicating the identifying-object image in the binary digit,
   wherein the identification unit recognizes the identifying-object taken as the identifying-object image in the input image, based on the number of counts for the value indicating the identifying-object image from the counter.

3. The image processor of claim 1, comprising two image-signal-differential outputting units and two binary digit units,
   wherein the two image-signal-differential outputting units respectively take images of the identifying-object with respect to different directions, input the images, and respectively output image-signal-differentials between the standard receiving optic and a receiving optic in each of the two image-signal-differential outputting units, with respect to each of the receiving optic designated one after another,
   wherein the two binary digit units respectively receive the image-signal-differentials output from the two image-signal-differential outputting units, respectively convert the image-signal-differentials to values in the binary digit indicating the identifying-object image and the background image, and
   wherein the identification unit detects an area of the identifying-object taken with respect to one of the different directions, and a height of the identifying-object taken with respect to another of the different directions, based on the image-signal-differentials converted to the binary digit by the two binary-digit-units and output from the two image-signal-differential outputting units, calculates a volume of the identifying-object based on the area and the height, and identifies the identifying-object taken as the identifying-object image in the input image.

4. An image processor comprising:
   (a) an image-signal-differential outputting unit which includes a group of receiving optics,
      for inputting a comparison image composed of an identifying-object image, which is made by taking an image of an identifying-object, and a background image, in which no identifying-object image is shown, by using partial receiving optics out of the group of receiving optics,
      for inputting a master image composed of a standard identifying-object image, which is made by taking an image of a standard identifying-object, and a background image, in which no standard identifying-object image is shown, by using a rest of receiving optics, which have not been used for inputting the comparison image, out of the group of receiving optics,
      for designating a receiving optic one after another in the partial receiving optics used for inputting the comparison image, and a receiving optic, corresponding to the receiving optic used for the comparison image, in the rest of receiving optics used for inputting the master image, and
      for outputting an image-signal-differential between the receiving optic used for inputting the comparison image and the receiving optic, corresponding to the receiving optic used for the comparison image, used for inputting the master image;
   (b) a ternary digit unit for inputting the image-signal-differential from the image-signal-differential outputting unit,
      for converting the image-signal-differential to a value out of three values in ternary digit indicating a case that the identifying-object image in the comparison image corresponds to the standard identifying-object image in the master image, a case that the master image has the standard identifying-object image and the comparison image has the background image, and a case that the master image has the background image and the comparison image has the identifying-object image, and
      for outputting the value in the ternary digit; and
   (c) an identification unit for calculating an area differential between the standard identifying-object image in the master image and the identifying-object image in the comparison image based on the value in the ternary digit output from the ternary digit unit, and identifying the identifying-object taken as the identifying-object image in the comparison image, based on the area differential.

5. A method for image processing, comprising steps of:
   taking an input image composed of an identifying-object image, which is made by taking an image of an identifying-object, and a background image, in which no identifying-object image is shown, by using a group of receiving optics;
   calculating an image-signal-differential between a standard receiving optic which is specifically defined and a receiving optic designated one after another in the group of receiving optics, with respect to each of the receiving optic designated one after another;

converting the image-signal-differential to a value out of two values in binary digit indicating the identifying-object image and the background image; and recognizing the identifying-object taken as the identifying-object image in the input image, based on the value in the binary digit.

6. The method of claim 5, wherein the step of converting further includes steps of:

counting the value indicating the identifying-object image in the binary digit, and performing one of increment and decrement for a number of counts for the value indicating the identifying-object image in the binary digit, wherein the step of recognizing the identifying-object taken as the identifying-object image in the input image includes a step of recognizing the identifying-object based on the number of counts for the value indicating the identifying-object image.

7. The method of claim 5 further comprising steps of:

taking two images of the identifying-object with respect to two different directions, calculating image-signal-differentials between the standard receiving optic and a receiving optic designated one after another in each of the two images, with respect to each of the receiving optic designated one after another, converting the image-signal-differentials to values in the binary digit indicating the identifying-object image and the background image, detecting an area of the identifying-object taken with respect to one of the two different directions, and a height of the identifying-object taken with respect to another of the two different directions, based on the image-signal-differentials converted to the values in the binary digit, calculating a volume of the identifying-object based on the area and the height, and recognizing the identifying-object taken as the identifying-object image in the input image based on the volume.

8. A method for image processing, comprising steps of:

taking a comparison image composed of an identifying-object image, which is made by taking an image of an identifying-object, and a background image, in which no identifying-object image is shown, by using partial receiving optics out of a group of receiving optics;

taking a master image composed of a standard identifying-object image, which is made by taking an image of a standard identifying-object, and a background image, in which no standard identifying-object image is shown, by using a rest of receiving optics, which have not been used for the comparison image, out of the group of receiving optics;

designating a receiving optic one after another in the partial receiving optics used for the comparison image, and a receiving optic, corresponding to the receiving optic used for the comparison image, in the rest of receiving optics used for the master image;

calculating an image-signal-differential between the receiving optic used for the comparison image and the receiving optic, corresponding to the receiving optic used for the comparison image, used for the master image;

converting the image-signal-differential to a value out of three values in ternary digit indicating a chase that the identifying-object image in the comparison image corresponds to the standard identifying-object image in the master image, a case that the master image has the standard identifying-object image and the comparison image has the background image, and a case that the master image has the background image and the comparison image has the identifying-object image;

calculating an area differential between the standard identifying-object image in the master image and the identifying-object image in the comparison image based on the value in the ternary digit; and recognizing the identifying-object taken as the identifying-object image in the comparison image, based on the area differential.

9. An object-identifying apparatus, comprising:

(a) a differential outputting unit for inputting input data composed of identifying-object data and other data, and outputting a differential between standard data specifically defined and each data in the input data, with respect to the each data;

(b) a distinguishing unit for inputting the differential with respect to the each data from the differential outputting unit, distinguishing the identifying-object data from the other data by converting the differential to be a value indicating the identifying-object data and a value indicating the other data, and outputting the value for the identifying-object data and the value for the other data; and (c) an identification unit for recognizing an identifying-object in the input data, based on the value for the identifying-object data and the value for the other data from the distinguishing unit.

10. The object-identifying apparatus of claim 9, further comprising a counter for counting the value indicating the identifying-object data out of the value for the identifying-object data and the value for the other data output from the distinguishing unit, and outputting a number of counts for the value indicating the identifying-object, wherein the identification unit recognizes the identifying-object in the input data, based on the number of counts for the value indicating the identifying-object.

11. The object-identifying apparatus of claim 9, wherein the standard data specifically defined is a part of the other data.

12. The object-identifying apparatus of claim 9, wherein the standard data specifically defined is master data composed of standard identifying-object data and the other data.

* * * * *